April 10, 1962  J. NICOL  3,029,380
ELECTRICAL MEASURING APPARATUS
Filed March 3, 1958

Inventor
James Nicol
by Roberts, Cushman & Grover
Attys

United States Patent Office 3,029,380
Patented Apr. 10, 1962

3,029,380
ELECTRICAL MEASURING APPARATUS
James Nicol, Wayland, Mass., assignor to Arthur D. Little, Inc., Cambridge, Mass., a corporation of Massachusetts
Filed Mar. 3, 1958, Ser. No. 718,582
11 Claims. (Cl. 324—34)

This invention relates to apparatus for measuring variations in a physical property of a substance, more particularly an electrical property such as impedance, magnetic or dielectric susceptibility, and environmental variables, such as temperature changes, which affect the electrical properties of the substance.

As an example, it may be desired to measure temperature changes in such a low range that conventional thermometric devices are inoperative. Under such a condition the magnetic susceptibility of a paramagnetic material is a measure of its temperature. One known device for measuring magnetic susceptibility, or magnetism, comprises two transformer coils in whose core or field is embraced the substance under measurement. An A.C. signal applied to one coil will be coupled to the second by the magnetic substance and as its susceptibility changes with temperature the coupling will change so that the amplitude of the signal in the secondary is a measure of the susceptibility. By opposing the signal in the second coil with a calibrated signal source adjusted so that current is nulled, the static measurements of susceptibility and temperature can be taken at any given instant by reading the adjusted position of the calibrated source. Similarly other types of impedance may be measured.

However, it is often desirable to measure impedance and record a measuring signal continuously, and it is an object of the present invention to provide apparatus which continuously produces a measurement signal.

According to the invention, apparatus for measuring an impedance comprises a primary circuit including an alternating signal source, a secondary circuit, means coupling said circuits including said impedance, said coupling means controlling the signal coupled to the secondary circuit, said secondary circuit including signal sensing and signal feedback means, and a signal amplifier circuit connected between said sensing and feedback means for applying to said feedback means a signal opposed to the signal coupled to the secondary circuit thereby to reduce current in said secondary circuit substantially to zero, said amplifier circuit including output means carrying a signal dependent on said feedback signal.

For the purpose of illustration typical embodiments of the invention are shown in the accompanying drawing in which FIG. 1 is a schematic diagram of a circuit for measuring magnetic susceptibility;

Figure 1:
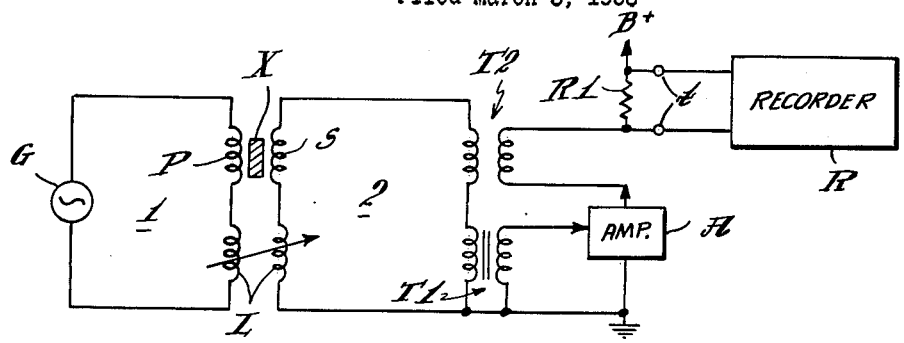

As shown in FIG. 1 the apparatus comprises a primary circuit 1, a secondary circuit 2, an amplifier A, and a recorder R. The primary circuit 1 includes an A.C. source G and is coupled to the secondary circuit by a transformer having a primary coil P and a secondary coil S, and by an adjustable mutual inductance L. The frequency of the A.C. source G will depend on the measurement involved, but as an example, may be 60 c.p.s. The core of the transformer P–S includes a sample or container of a substance X whose property or condition is to be tested. As shown, the transformer and inductance are so wound that opposing signals are produced in the secondary circuit. If, for example, the temperature of a paramagnetic salt sample of potassium chromium sulfate is to be measured in the range of 0.1° K. to 4.2° K., the sample may be held to 4.2° K. and the inductance be adjusted for null current in the secondary. Thereafter variations in the temperature of the paramagnetic salt sample will increase the signal transmitted by the transformer P–S and produce unbalance with the opposing signal of the mutual inductance L. An unbalance current would then tend to flow in the secondary circuit 2, but is opposed by a feedback signal as follows.

The signal in the secondary circuit resulting from unbalance between the opposed signals in the secondaries of the transformer P–S and mutual inductance L is sensed by a transformer T1 coupled to a wide band, high gain amplifier A whose output is coupled through a feedback transformer T2 to the secondary circuit. There may be some signal amplification in the transformer T1 and further amplification in the amplifier and feedback transformer, the total amplification being sufficient and the phase being such as to oppose the unbalance signal of transformer P–S and mutual inductance L and reduce the net current in the secondary circuit substantially to zero. Of course, some net signal must remain to provide an input to the amplifier circuit, but if the total gain of the amplifier circuit is high, for example 100 times the net signal, then the feedback signal will be within 1% of the unbalance signal and will be an accurate measure of the unbalance signal resulting from temperature change in the substance X.

The feedback signal is also carried by an output resistor R1 in series with the amplifier output and its plate supply B+, for example. The voltage across the resistor R1 which appears at the output terminals $t$ is directly dependent on the amplitude of the feedback signal and hence is also a measure of the unbalance signal of the secondary circuit. This signal may be continuously applied to the recorder R, preferably after rectification, to provide a continuous record of the unbalance signal and the temperature of the paramagnetic sample X.

While a temperature measurement is chosen to illustrate the operation of the circuit of FIG. 1, it should be understood that magnetic susceptibility or other related variables which affect the impedance of transformer P–S may be measured.

Figure 2:
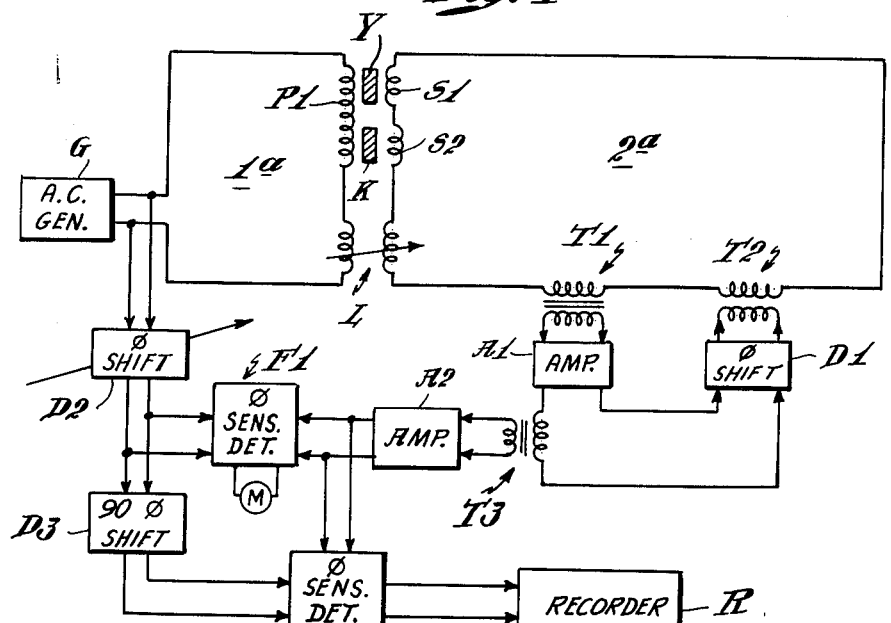
FIG. 2 is a like diagram showing a further form of circuit.

Shown in FIG. 2, for example, is a circuit for measuring the proportions of a mixture of a magnetic (or paramagnetic) material and a non-magnetic material. A fluid mixture may, by way of example, constitute a suspension of powdered iron, which is magnetic, in liquid aluminum which is electrically resistive but non-magnetic. The mixture will reflect only the magnetism of the magnetic iron, and hence, if other conditions are kept constant, variations in the magnetic susceptibility of the mixture will indicate increase or decrease in the proportion of paramagnetic material.

As shown in FIG. 2 the variable mixture Y is disposed between a primary coil P1 and a secondary coil S1 in a non-magnetic container or conduit. The primary coil P1 and a mutual inductance L primary are in a primary circuit 1a like that of FIG. 1.

The secondary circuit 2a differs from that previously described by the inclusion of an additional secondary S2 coupled to the primary P1 through a standard sample K which may be statically held in a non-magnetic container. The standard secondary S2 is wound oppositely to the test secondary S1 so that the signal developed in secondary S2 opposes that in secondary S1. Current in the secondary circuit is nulled by holding the test mixture Y and standard mixture K under unvarying conditions and adjusting the mutual inductance L. Thereafter variations in the constitution of the mixture Y will produce an inductive coupling between primary and secondary circuits which differs from the coupling of the standard K. An unbalance current will tend to flow in the secondary as previously described.

The unbalance signal is sensed by a transformer T1, amplified by a high gain, wide band amplifier A1 and a negative feedback signal is applied to the secondary circuit 2a as described with reference to FIG. 1. The amplifier circuit includes a 180° phase shift represented by the block labelled D1. The signal fed back to the secondary circuit is thus substantially equal and opposite in phase to the unbalance signal or at least with the component of the unbalance signal which is attributable to variations in the reactive or impedance coupling characteristic such as magnetic susceptibility of the magnetic iron suspension in the variable mixture Y.

Components other than reactive, i.e. caused by changes in inductance or capacitance, will be introduced into the unbalance signal by the electrically resistive material such as aluminum in the mixture. Eddy currents will be induced in such a resistive constituent and will introduce an undesirable signal component in the secondary 2a.

Figure 3:
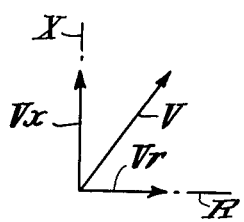
FIG. 3 is a vector diagram showing the phase relation between components of signals produced by the apparatus of FIG. 2.

As shown in the vector diagram of FIG. 3 the unbalance signal may comprise a vector V having a resistive component $V_r$ in phase with the primary circuit signal and a reactive component $V_x$ 90° out of phase. While the resultant signal V may be fed back in opposition to the unbalance current in the secondary circuit, it is only the reactive vector $V_x$ which is a measure of change in the magnetism of the mixture Y, and accordingly the circuit of FIG. 2 includes phase sensitive means for discriminating between the resistive and reactive components in the feedback signal.

The feedback signal is coupled by a transformer T3 to a narrow band amplifier A2 tuned to the frequency of the A.C. source G. The tuned amplifier output is applied to two phase sensitive detectors F1 and F2. The A.C. signal of the primary circuit 1a is fed to the first detector F1 through a variable phase shifting network D2, and also through a 90° phase shifting network D3 to the second detector so that the source signal applied to the second detector is 90° out of phase with that applied to the first. For adjustment purposes the detectors may be connected to a meter M or recorder R.

A phase sensitive detector, or lock in amplifier, as it is known in the art, compares the A.C. source signal with the input signal and detects only that component of the input signal which is in a predetermined phase relation to the source signal. In the present case, since the resistive and reactive components are 90° out of phase with each other, the first detector F1 will detect only one component and the second detector only the other, depending on the adjustment of the variable phase shifter D2. The output of each detector is a D.C. signal dependent on the magnitude of the selected A.C. component.

With both the test mixture Y and standard K constituting only magnetic iron in such low concentration as to contribute a negligible resistive component, and with the secondary circuit 2a unbalanced, the variable phase shifting network D2 is adjusted so that one meter or recorder reaches a maximum signal and the other a zero signal indication. The detector reading maximum will be sensing only the reactive component. The other detector may be used for recording the resistive component later introduced when the iron is suspended in liquid aluminum.

It will be understood that the two circuits described are shown for the purpose of illustration only and that the present invention includes various modifications and equivalents falling within the scope of the appended claims. Thus while I have shown test substances varying inductive coupling between primary and secondary circuits, other impedances, inductive or capacitive, may be used.

I claim:

1. Apparatus for measuring an impedance comprising, a primary circuit including an alternating signal source, a secondary circuit, means coupling said circuits including said impedance, said coupling means controlling the signal coupled to the secondary circuit, said secondary circuit additionally including signal sensing and signal feedback means, and a signal amplifier circuit connected between said sensing and feedback means for applying to said feedback means a signal opposed to the coupled signal in the secondary circuit, said signal amplifier being connected thereby to reduce current in said secondary circuit substantially to zero, said feedback means being reactively coupled to said secondary circuit so as to isolate current in said amplifier circuit from said primary circuit, and said amplifier circuit including output means carrying a signal dependent on said feedback signal only.

2. Apparatus for measuring an impedance comprising, a primary circuit including an alternating signal source, a secondary circuit, means coupling said circuits including said impedance, said coupling means controlling the signal coupled to the secondary circuit, said secondary circuit additionally including signal sensing and signal feedback means, a signal amplifier circuit connected between said sensing and feedback means for applying to said feedback means a signal opposed to the coupled signal in the secondary circuit, said signal amplifier being connected thereby to reduce current in said secondary circuit substantially to zero, said feedback means being reactively coupled to said secondary circuit so as to isolate current in said amplifier circuit from said primary circuit, and said amplifier circuit including output means carrying a signal dependent on said feedback signal, and indicating or recording means connected to said output means only.

3. Apparatus for measuring variations in an impedance comprising, a primary circuit including an alternating signal source, a secondary circuit, means coupling said circuits including said impedance, said coupling means controlling the signal variations coupled to the secondary circuit, said secondary circuit additionally including signal sensing and signal feedback means, a signal amplifier circuit connected between said sensing and feedback means for applying to said feedback means a signal opposed to the coupled signal in the secondary circuit, said signal amplifier being connected thereby to reduce current in said secondary circuit substantially to zero, said feedback means being reactively coupled to said secondary circuit so as to isolate current in said amplifier circuit from said primary circuit, and said amplifier circuit including output means carrying a signal dependent on said feedback signal, and continuously indicating or recording means connected to said output means only.

4. Apparatus for measuring an impedance comprising, a primary circuit including an alternating signal source, a secondary circuit, means coupling said circuits including said impedance, said coupling means controlling the signal coupled to the secondary circuit, and a signal amplifier circuit, said secondary circuit and amplifier circuits having mutual coupling means including a signal sensing transformer and a signal feedback inductance, said signal amplifier circuit being connected between said sensing transformer and feedback inductance for applying to said inductance a signal opposed to the coupled signal in the secondary circuit, said signal amplifier being connected thereby to reduce current in said secondary circuit substantially to zero, said amplifier circuit including output means carrying a signal dependent on said feedback signal.

5. Apparatus for measuring variations in a physical property of a substance comprising, a primary circuit including an alternating signal source, a secondary circuit, means coupling said circuits including an impedance responsive to variations in the property of said substance to change the signal coupled to the secondary circuit, said secondary circuit additionally including signal sensing and signal feedback means, and a signal amplifier circuit connected between said sensing and feedback means for applying to said feedback means a signal opposed to the coupled signal in the secondary circuit, said signal amplifier being connected thereby to reduce current in said secondary circuit substantially to zero, said feedback means being reactively coupled to said secondary circuit so as to isolate current in said amplifier circuit from said primary circuit, and said amplifier circuit including output means carrying a signal dependent on said feedback only.

6. Apparatus for measuring variations in a physical property of a substance comprising, a primary circuit including an alternating signal source, a secondary circuit, means coupling said circuits including an impedance responsive to variations in the property of said substance to change the signal coupled to the secondary circuit, said secondary circuit additionally including signal sensing and signal feedback means, a signal amplifier circuit connected between said sensing and feedback means for applying to said feedback means a signal opposed to the coupled signal in the secondary circuit, said signal amplifier being connected thereby to reduce current in said secondary circuit substantially to zero, said feedback means being reactively coupled to said secondary circuit so as to isolate current in said amplifier circuit from said primary circuit, and said amplifier circuit including output means carrying a signal dependent on said feedback, and continuously indicating or recording means connected to said output means only.

7. Apparatus for measuring variations in a physical property of a substance comprising, a primary circuit including an alternating signal source, a secondary circuit, means coupling said circuits including an impedance responsive to variations in the property of said substance to change the signal coupled to the secondary circuit, a signal amplifier circuit, said secondary and amplifier circuits having mutual coupling means including a signal sensing transformer and a signal feedback inductance, said amplifier circuit being connected between said sensing transformer and feedback inductance for applying to said inductance a signal opposed to the coupled signal in the secondary circuit, said signal amplifier being connected thereby to reduce current in said secondary circuit substantially to zero, said amplifier circuit including output means carrying a signal dependent on said feedback, and indicating or recording means connected to said output means.

8. Apparatus for measuring an impedance comprising, a primary circuit including an alternating signal source, a secondary circuit, means coupling said circuits including said impedance, said coupling means controlling the signal coupled to the secondary circuit, said secondary circuit additionally including signal sensing and signal feedback means, a signal amplifier circuit connected between said sensing and feedback means for applying to said feedback means a signal opposed to the coupled signal in the secondary circuit, said signal amplifier being connected thereby to reduce current in said secondary circuit substantially to zero, said amplifier circuit including output means carrying a signal dependent on said feedback, a phase sensitive signal detector, means coupling the output of said amplifier to said detector, and means coupling said alternating signal source to said detector, thereby to cause said detector to select a component of the signal at said output means dependent on the phase of said component.

9. Apparatus for measuring variations in a physical property of a substance comprising, a primary circuit including an alternating signal source, a secondary circuit, means coupling said circuits including an impedance responsive to variations in the property of said substance to change the signal coupled to the secondary circuit, said secondary circuit additionally including signal sensing and signal feedback means, a signal amplifier circuit connected between said sensing and feedback means for applying to said feedback means a signal opposed to the coupled signal in the secondary circuit, said signal amplifier being connected thereby to reduce current in said secondary circuit substantially to zero, said amplifier circuit including output means carrying a signal dependent on said feedback, a phase sensitive signal detector, means coupling the output of said amplifier to said detector, and means coupling said alternating signal source to said detector, thereby to cause said detector to select a component of the signal at said output means dependent on the phase of said component.

10. Apparatus for measuring variations in a physical property of a substance comprising, a primary circuit including an alternating signal source, a secondary circuit, means coupling said circuits including an impedance responsive to variations in the property of said substance to change the signal coupled to the secondary circuit, said secondary circuit additionally including signal sensing and signal feedback means, a signal amplifier circuit connected between said sensing and feedback means for applying to said feedback means a signal opposed to the coupled signal in the secondary circuit, said signal amplifier being connected thereby to reduce current in said secondary circuit substantially to zero, said amplifier circuit including output means carrying a signal dependent on said feedback, a phase sensitive signal detector, means coupling the output of said amplifier to said detector, and means coupling said alternating signal source to said detector including means for adjusting the phase of the signal applied to the detector, thereby to cause said detector to select a component of the modified signal dependent on the phase of said component.

11. The method of measuring the instantaneous value of an impedance which comprises applying an alternating current signal to the impedance so that the impedance transmits a secondary signal depending on its instantaneous value, sensing and amplifying the secondary signal, opposing said secondary signal only with the amplified signal in a circuit isolated from the primary circuit thereby to reduce secondary signal current substantially to zero independently of the primary signal, and directly measuring the magnitude of said amplified signal thereby to obtain a measure of said impedance value dependent only on said primary signal and independently of said secondary and amplified signal.

References Cited in the file of this patent

UNITED STATES PATENTS

| | | |
|---|---|---|
| 2,010,189 | Hallowell | Aug. 6, 1935 |
| 2,489,920 | Michel | Nov. 29, 1949 |
| 2,594,947 | Lynch | Apr. 29, 1952 |
| 2,806,992 | Foerster | Sept. 17, 1957 |
| 2,925,554 | Hayes | Feb. 16, 1960 |

OTHER REFERENCES

Mee et al.: "An Improved Precision Permeameter," Proceedings of the Institute of Electrical Engineering, December 1954; vol. 101, Part II, pages 639–642.